(12) United States Patent
Frasher et al.

(10) Patent No.: US 6,669,275 B2
(45) Date of Patent: Dec. 30, 2003

(54) VEHICLE PILLAR STRUCTURE

(75) Inventors: Douglas H. Frasher, Newbury Park, CA (US); Geza Loczi, Moorpark, CA (US); Hans Olof Pehrson, Torslanda (SE); Kolita Mendis, Thousand Oaks, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/194,719

(22) Filed: Jul. 12, 2002

(65) Prior Publication Data

US 2002/0171263 A1 Nov. 21, 2002

Related U.S. Application Data

(63) Continuation of application No. 09/754,922, filed on Jan. 5, 2001, now Pat. No. 6,428,087.

(51) Int. Cl.[7] .............................. B60J 1/02; B60R 21/04
(52) U.S. Cl. ................. 296/203.02; 296/200; 296/201; 296/146.1
(58) Field of Search ................. 296/190.1, 203.02, 296/200, 201, 146.1, 189, 188; 89/36.08, 36.09

(56) References Cited

U.S. PATENT DOCUMENTS

| | | | | |
|---|---|---|---|---|
| 1,470,308 A | * | 10/1923 | Wilms | 296/200 |
| 1,593,005 A | * | 7/1926 | Bailey | 296/200 |
| 1,894,383 A | * | 1/1933 | Smith | 296/201 |
| 2,023,238 A | * | 12/1935 | Northup | 296/146.16 |
| 4,807,925 A | * | 2/1989 | Sakamoto et al. | 296/194 |
| 4,988,142 A | * | 1/1991 | Chandler et al. | 296/146.1 |
| 5,941,596 A | * | 8/1999 | See | 296/201 |
| 6,428,087 B1 | * | 8/2002 | Frasher et al. | 296/203.02 |

* cited by examiner

*Primary Examiner*—D. Glenn Dayoan
*Assistant Examiner*—Gregory Blankenship
(74) *Attorney, Agent, or Firm*—Mark S. Sparschu

(57) ABSTRACT

A driver's compartment for a vehicle includes an A-pillar structure (28) having an exterior surface (30) and an interior surface (32). The A-pillar (28) has a plurality of openings (34) formed in the A-pillar (28) that extend from the interior surface (32) to the exterior surface (30). Each of the plurality of openings (34) is oriented towards a driver's eyes, such that a driver can see through one or more of the plurality of openings (34) when positioned in a vehicle seat (14).

13 Claims, 2 Drawing Sheets

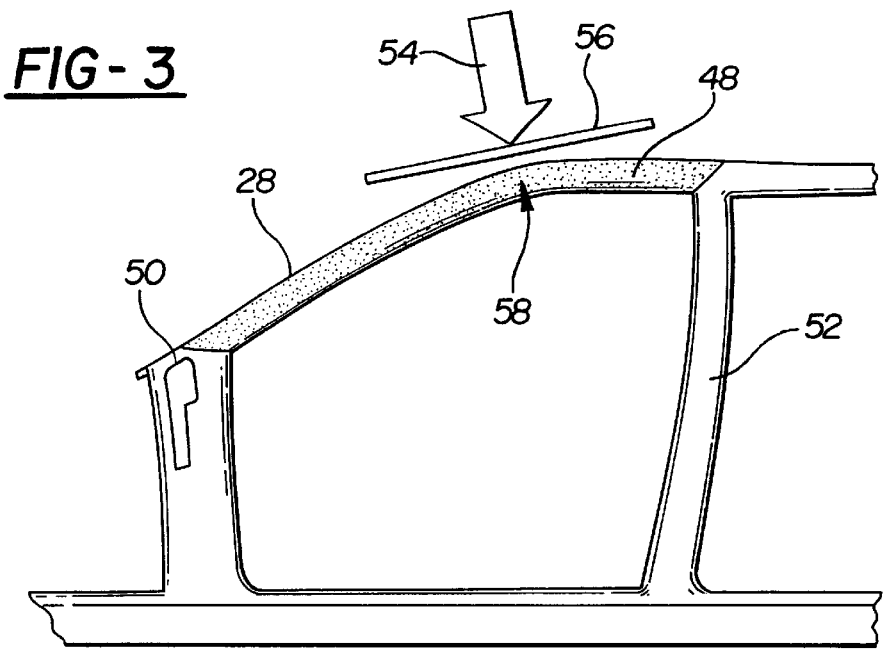
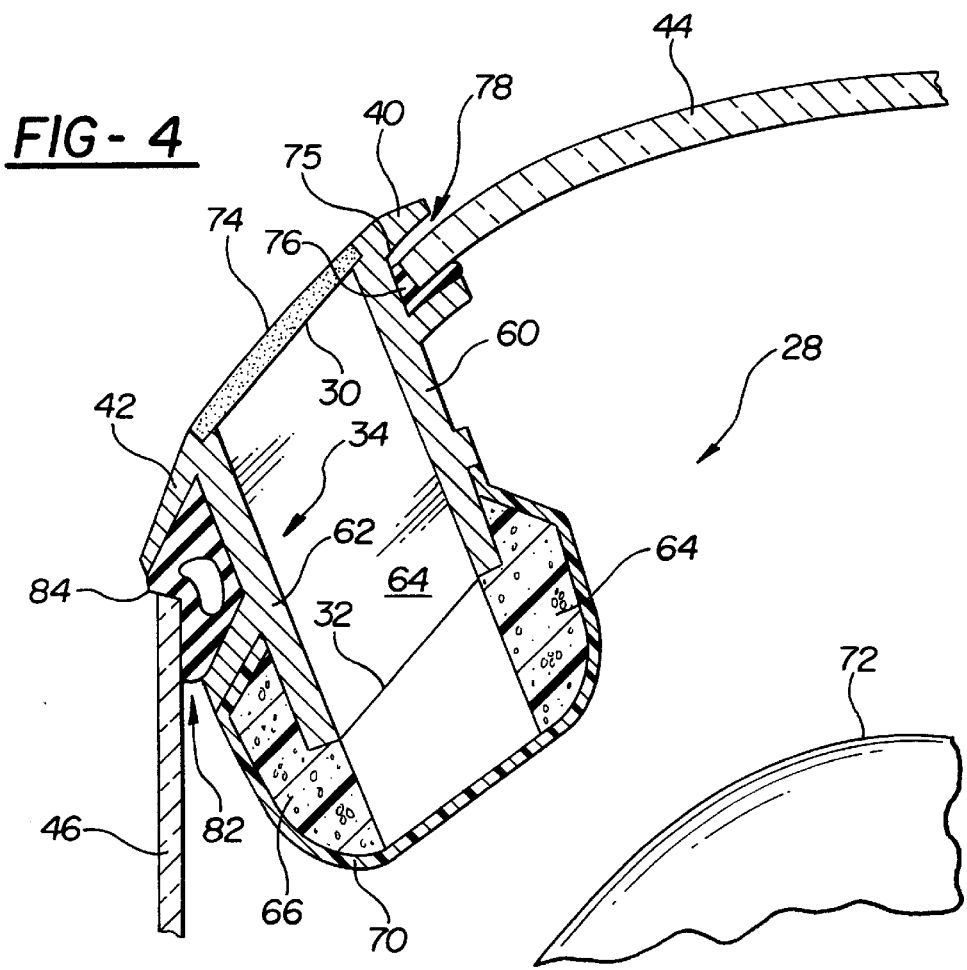

VEHICLE PILLAR STRUCTURE

CROSS-REFERENCE TO RELATED APPLICATIONS

The present application is a continuation application of U.S. application Ser. No. 09/754,922, entitled "A-Pillar Structure For a Vehicle," which was filed on Jan. 5, 2001 now U.S. Pat. No. 6,428,087.

TECHNICAL FIELD

The present invention relates generally to a vehicle having improved driver visibility, and more particularly to an A-pillar structure for a vehicle that provides improved driver visibility.

BACKGROUND OF THE INVENTION

Providing improved driver visibility is an important objective of most current vehicles. One known system for improving the visibility of a driver is through an adjustable seating system, which is well known in the art. Current adjustable seating systems typically allow a user to electronically adjust a variety of seating characteristics through actuation of one or more switches or buttons. These available adjustments typically include the height of the seat base and seat back, the angle or cant of the seat base and seat back, and the distance of the seat from the steering wheel. Through these adjustments, a driver can improve his or her visibility through the front window, to the instrument panel and to the side view mirrors.

Additionally, many current adjustable seat systems provide a controller with a memory source that allows for the storage of one or more custom seat settings. These custom settings allow a driver to position the seat according to his or her own desired seat position by modifying one or more of the available adjustments and then storing the custom setting on the memory source. Thereafter, the driver can automatically return the seat to its custom setting by pressing a memory recall button instead of having to individually position each portion of the seat each time that individual drives the vehicle to provide adequate visibility.

While these seat systems allow drivers of varying statures to adjust the seat and steering wheel to provide adequate visibility through the front window, to the side mirrors, and to the dashboard, they still do not provide a user with adequate visibility to a blind spot hidden by typical vehicle A-pillars. This inability to locate objects that would otherwise be seen, except for the blocking by the A-pillar structure, can create potential safety concerns for the driver, other drivers, and pedestrians.

SUMMARY OF THE INVENTION

It is therefore an object of the present invention to provide a vehicle with improved visibility for drivers of varying stature.

It is another object of the present invention to provide an A-pillar structure for a vehicle that provides improved resistance to rollover forces.

It is a further object of the present invention to provide an A-pillar structure for a vehicle that provides increased protection to head impact from the inside of the vehicle.

In accordance with the above and the other objects of the present invention, an A-pillar structure for a vehicle is provided. The A-pillar has an exterior surface and an interior surface. The A-pillar has a plurality of holes formed in the A-pillar that extend from the interior surface to the exterior surface. Each of the plurality of openings is oriented towards a driver's eyes, such that a driver can see through one or more of the plurality openings when positioned in a vehicle seat.

These and other features of the present invention will become apparent from the following description of the invention, when viewed in accordance with the accompanying drawings and appended claims.

BRIEF DESCRIPTION OF THE DRAWINGS

FIG. 3 is a schematic illustration of an A-pillar structure and the direction of a rollover force applied thereto in accordance with a preferred embodiment of the present invention; and structure of FIG. 2 along the line 4—4.

DETAILED DESCRIPTION OF THE PREFERRED EMBODIMENT(S)

Figure 1:
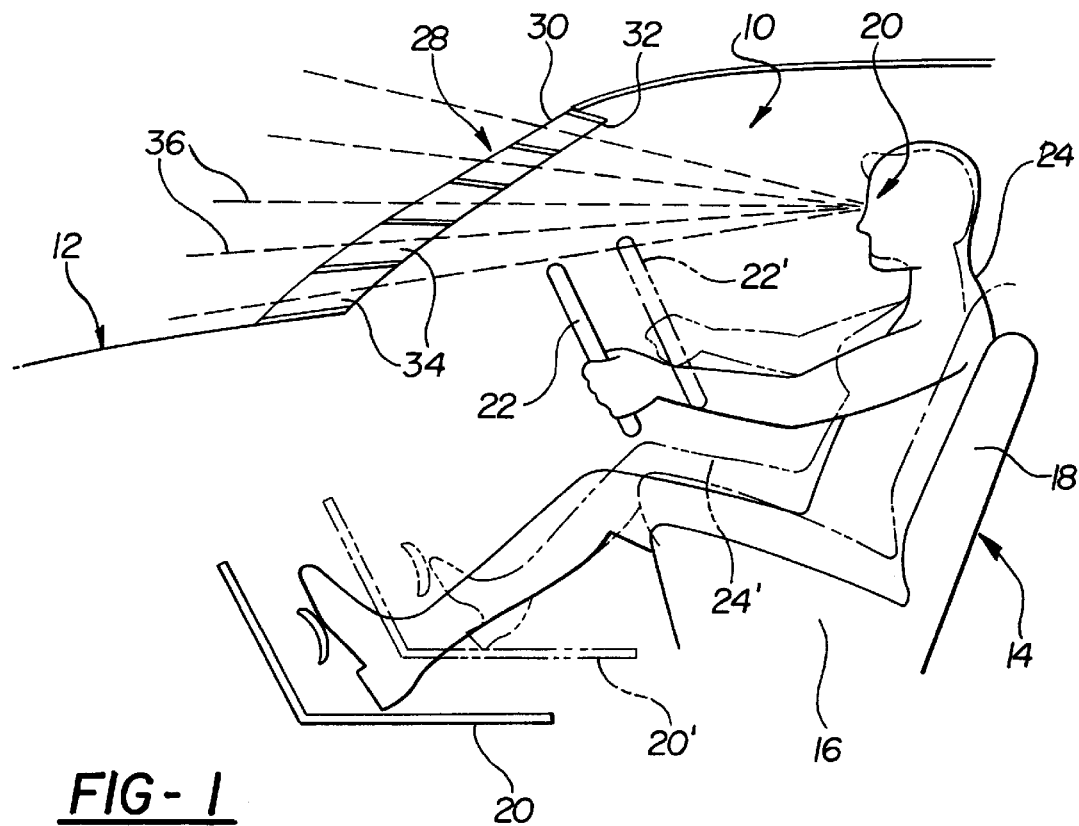
FIG. 1 is a side view schematically illustrating a driver's compartment of a vehicle having an A-pillar structure for providing improved driver visibility in accordance with a preferred embodiment of the present invention.

Referring now to FIG. 1, which schematically illustrates a driver's compartment 10 of a vehicle 12. The driver's compartment includes a vehicle seat 14 having a seat bottom 16 and a seat back 18, a pedal box 20, and a steering wheel 22. The vehicle seat 14, the pedal box 20, and the steering wheel 22, are all moveable to accommodate drivers having a wide range of varying statures. Each of the components 14, 20, 22, is shown in solid lines in a position to accommodate a driver 24 of larger stature. The components are also moveable to a position shown in phantom lines 14', 20', 22' to accommodate a driver 24' of smaller stature.

The vehicle seat 14, the pedal box 20, and the steering wheel 22 are all preferably automatically adjustable in order to locate a physical feature of a driver in an optimum position for visibility and safety. The optimum position is generally indicated by reference number 26 and the physical feature is preferably the driver's eyes. The automatic adjustability based on a fixed position sensor is described in detail in co-pending U.S. application Ser. No. 09/690,290, entitled "Seating System With Optimum Visibility", which was filed on Oct. 17, 2000, and which is hereby incorporated by reference The driver's compartment includes an A-pillar 28 located in its customary location. In accordance with the preferred embodiment, the A-pillar has an exterior surface 30 and an interior surface 32 with a plurality of openings 34 extending from the interior surface 32 to the exterior surface 30. The openings 34 create passageways that allow the driver 24 to have clear lines of sight 36 through the A-pillar 28. These lines of sight 36 would otherwise be obstructed from view by conventional A-pillars.

Figure 2:
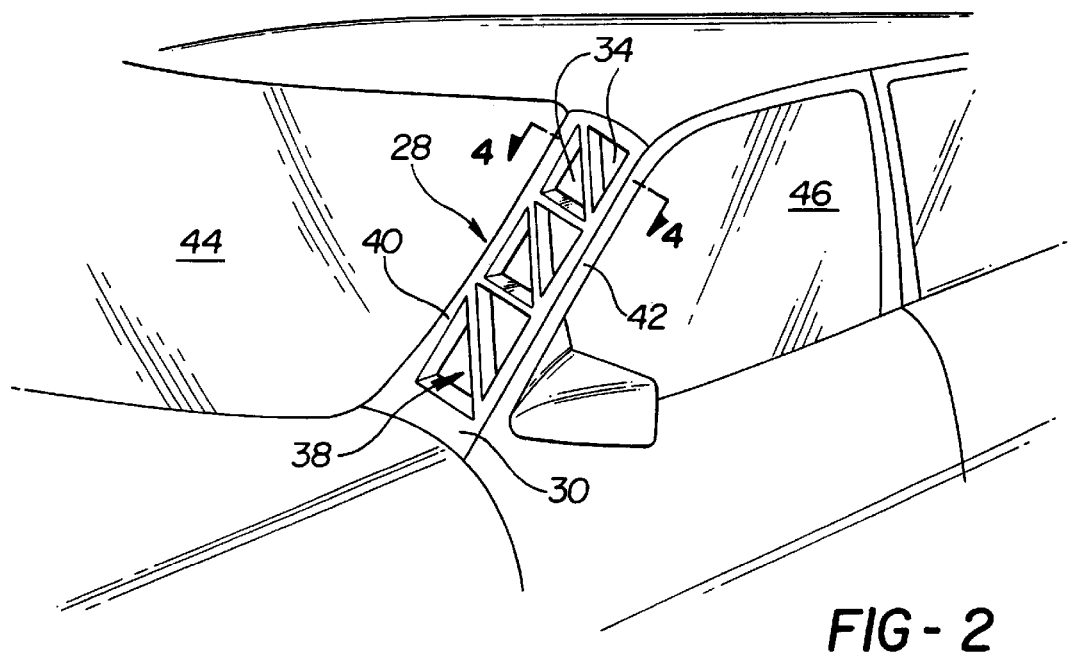
FIG. 2 is a schematic perspective view of a vehicle having an A-pillar structure for providing improved driver visibility in accordance with a preferred embodiment of the present invention.

The openings 34 are shown in more detail in FIG. 2. The openings 34 are preferably triangular in shape. Additionally, the triangles are preferably positioned in pairs such that a pair of adjacent triangles are positioned to form a square. However, other arrangements may obviously be utilized. The shape of the openings 34 in the A-pillar 28 are designed to maximize the strength and stiffness of the A-pillar structure 28. The triangular-shaped openings 34 create a cross-bracing 38 between the two sides 40, 42 of the pillar 28. This cross-bracing 38 is oriented in a plane that passes through the eyepoint of the driver. The first side 40 of the A-pillar 28 is preferably in contact with a vehicle windshield 44 and the second side 42 of the A-pillar 28 is preferably in contact with a driver's side window 46.

Referring now to FIG. 3, the A-pillar structure 28 is preferably manufactured as an Aluminum forging or thin wall casting using a high ductility alloy. The Aluminum A-pillar component 28 is formed contiguous with a cantrail structure 48. This structural component comprised of the A-pillar 28 and the cantrail 48 form a joint free span between a cowl 50 and a B-pillar 52. In the event of a rollover accident, rollover forces, generally indicated by reference number 54, will typically be directed at the front corner of the roof. These forces 54 are thus, applied at the middle of the strong structural entity comprised of the A-pillar 28 and the cantrail 48, which has no intervening joints.

As is known, Section 216 of the Federal Motor Vehicle Safety Standards demand that such a structure be tested by application of a load applied at the upper edge of the A-pillar 28 via a rigid unyielding block, generally indicated by reference number 56, oriented 5 degrees forward in a side view and 25 degrees sideways in an end view. To comply, the body structure must withstand the lesser of 1.5 times the vehicle mass or 5000 lbs under such a loading condition, without deforming more than 5 inches. The cast or forged A-pillar 28 has cross-sections that are sized to withstand similar loading conditions. The absence of joints in this structural span is particularly beneficial in vehicle designs where the slope of the A-pillar is steep, which causes high bending moments at the corner 58 where the A-pillar 48 and cantrail 28 meet. The contiguous A-pillar/cantrail component is configured such that it has a larger cross-section where the highest bending moments occur due to rollover loads to provide the requisite sherget.

The preferred A-pillar 28 also provides sufficient protection against head impact inside the vehicle. As shown in FIG. 4, which is a cross-section of the A-pillar 28 in the horizontal plane, the A-pillar 28 has two side sections 60, 62 that are located on either side of the openings 34 and connect the exterior surface 30 with the interior surface 32. The sides 60, 62 of the A-pillar 28 are connected by a pair of energy absorbing elements 64, 66. The energy absorbing elements 64, 66 are attached to the two edges of the side sections 60, 62 adjacent the interior surfaces of the A-pillar 28. A transparent and pliable plastic trim panel 70 preferably covers the energy absorbing elements.

Section 208 of the Federal Motor Vehicle Safety Standard requires the use of a headform 72 during testing to impact the A-pillar 28. During testing, the headform 72 initially hits the plastic trim panel 70 and crushes the energy absorbing elements 64, 66, thus cushioning the severity of the impact without ever contacting the Aluminum structure of the A-pillar 28. An exterior plastic panel 74 covers the pillar openings 34 on the exterior of the vehicle. The A-pillar 28 preferably has a channel 75 in which the windshield glass 44 fits and contacts a sealing bead 76. The forward edge 78 of the channel 75 also serves as a windshield rain gutter 80. The outer edge of the A-pillar 28 also contains a channel 82 that contains a seal strip 84 for contacting and sealing the side window glass 46 of doorframe.

Having now fully described the invention, it will become apparent to one of ordinary skill in the art that many changes and modifications can be made thereto without departing from the spirit or scope of the invention as set forth fully herein.

What is claimed is:

1. A pillar for a vehicle, wherein the pillar is disposed between a lower body portion of the vehicle and a roof of the vehicle; the pillar defining a plurality of visual openings therethrough, said plurality of openings providing visibility from the interior to the exterior of the vehicle through said plurality of openings.

2. A pillar as recited in claim 1, wherein the pillar has a length and said plurality of visual openings are separated by structural elements.

3. A pillar as recited in claim 2, wherein adjacent openings of said plurality of openings are each separated by a respective structural element.

4. A pillar as recited in claim 3, wherein said structural elements provide strength and stiffness to the pillar.

5. A pillar as recited in claim 2, wherein said plurality of visual openings are triangular in shape.

6. A pillar as recited in claim 5, wherein pairs of said plurality of openings form substantially rectangular shapes.

7. A pillar as recited in claim 5, wherein pairs of said plurality of openings form substantially square shapes.

8. A pillar as recited in claim 2, wherein the pillar extends from said roof to a cowl of the vehicle.

9. A pillar as recited in claim 3, wherein the pillar extends from said roof to a cowl of said vehicle.

10. A pillar as recited in claim 2, wherein the pillar is disposed adjacent a front windscreen of the vehicle.

11. A pillar as recited in claim 3, wherein the pillar is disposed adjacent a front windscreen of the vehicle.

12. A pillar for a vehicle comprising:

the pillar being comprised of a single metal body disposed between a lower body portion of the vehicle and a roof of the vehicle, the pillar defining at least one visual opening therethrough, said at least one visual opening providing visibility from an interior to at exterior of the vehicle through the pillar, the pillar having lateral boundaries comprising structural metal adjacent said at least one visual opening the pillar being disposed adjacent a front windshield of the vehicle.

13. A pillar as recited in claim 12, wherein the pillar extends from the roof to a cowl of the vehicle.

\* \* \* \* \*